(12) United States Patent
Zhao

(10) Patent No.: US 10,820,975 B2
(45) Date of Patent: Nov. 3, 2020

(54) MOUTH-CONTAINING TOOTHBRUSH

(71) Applicant: BOE TECHNOLOGY GROUP CO., LTD., Beijing (CN)

(72) Inventor: Weixiang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 167 days.

(21) Appl. No.: 16/010,201

(22) Filed: Jun. 15, 2018

(65) Prior Publication Data
US 2019/0117355 A1   Apr. 25, 2019

(30) Foreign Application Priority Data

Oct. 23, 2017 (CN) .......................... 2017 1 0994010

(51) Int. Cl.
*A61C 17/22*   (2006.01)
*A61C 17/34*   (2006.01)
*A61C 17/26*   (2006.01)

(52) U.S. Cl.
CPC ............ *A61C 17/228* (2013.01); *A61C 17/26* (2013.01); *A61C 17/349* (2013.01); *A61C 17/3481* (2013.01)

(58) Field of Classification Search
CPC .......................... A61C 17/228; A61C 17/3481
See application file for complete search history.

(56) References Cited

U.S. PATENT DOCUMENTS

| | | | | |
|---|---|---|---|---|
| 4,538,315 A * | 9/1985 | Barth ...................... | A46B 13/08 | 15/22.1 |
| 10,413,390 B2 * | 9/2019 | Yao ........................ | A61C 17/228 | |
| 2009/0276972 A1 * | 11/2009 | Dugan ..................... | A46B 7/00 | 15/167.2 |
| 2010/0324460 A1 * | 12/2010 | Van Der Rijt ....... | A61C 17/228 | 601/84 |
| 2011/0289709 A1 * | 12/2011 | Attaway ................. | A61C 17/22 | 15/167.2 |
| 2017/0100223 A1 * | 4/2017 | Silverberg .......... | A46B 15/0004 | |

FOREIGN PATENT DOCUMENTS

| | | |
|---|---|---|
| CN | 203829082 U | 9/2014 |
| CN | 2674930 Y | 2/2015 |
| CN | 106333755 A | 1/2017 |

* cited by examiner

*Primary Examiner* — Randall E Chin
(74) *Attorney, Agent, or Firm* — Foley & Lardner LLP

(57) ABSTRACT

A mouth-containing toothbrush includes a housing, a first tooth-brushing module assembly and a rotary drive assembly. The housing has a groove for containing teeth. The groove has a first inner groove face, a second inner groove face, and a bottom face connected between the first inner groove face and the second inner groove face. The first tooth-brushing component is used for cleaning surfaces of the teeth, and the first tooth-brushing component includes a brush body shaft and bristles arranged on an outer circumference of the brush body shaft. The brush body shaft is rotatably arranged between at least one of the first inner groove face and the second inner groove face and the teeth, and the brush body shaft extends along an extension direction of the groove. The rotary drive assembly is used to drive rotation of the brush body shaft.

19 Claims, 2 Drawing Sheets

MOUTH-CONTAINING TOOTHBRUSH

CROSS REFERENCE

This application is based upon and claims priority to Chinese Patent Application No. 201710994010.5, filed on Oct. 23, 2017, the entire contents thereof are incorporated herein by reference.

TECHNICAL FIELD

The present disclosure relates to an electric toothbrush, in particular to a mouth-containing toothbrush which can directionally rub or otherwise contact surfaces of teeth.

BACKGROUND

With the continuous improvement of the quality of life, people's requirements for toothbrushes is higher and higher, and people constantly pursue more efficient and convenient way of brushing teeth. At present, electric toothbrushes have been widely used, making the brushing process labor-saving and time-saving, and is popular with customers. However, during the whole process of tooth-brushing using an electric toothbrush, people need to hold a toothbrush to assist in brushing teeth, till the end of the tooth-brushing process.

The above information disclosed in the part "Background" is only for enhancement of understanding of the background of the present disclosure.

SUMMARY

According to one aspect of the present disclosure, a mouth-containing toothbrush is provided, which includes a housing, a first tooth-brushing component and a rotary drive assembly. The housing has a groove for containing teeth. The groove has a first inner groove face, a second inner groove face, and a bottom face connected between the first inner groove face and the second inner groove face. The first tooth-brushing component is configured to clean surfaces of the teeth. The tooth-brushing component includes a brush body shaft and bristles arranged on an outer circumference of the brush body shaft, and the brush body shaft is rotatably arranged between the teeth and one of the first inner groove face and the second inner groove face. The brush body shaft extends along an extension direction of the groove. The rotary drive assembly is used to drive the brush body shaft.

According to an arrangement of the disclosure, the brush body shaft causes rotation of the bristles. The bristles passes a tooth root and subsequently passes a tooth tip.

According to an arrangement of the disclosure, the rotary drive assembly includes a gear set and a power source. The gear set includes a driving gear driven by the power source and a driven gear that is fixedly connected to the brush body shaft. The driving gear is engaged with the driven gear to cause rotation of the brush body shaft.

According to an arrangement of the disclosure, the groove includes a upper groove and a lower groove. Each groove has a first inner groove face and a second inner groove face that are oppositely disposed, and a bottom face connected between the first inner groove face and the second inner groove face. The first tooth-brushing component includes a first brush body shaft and a second brush body shaft. Each brush body shaft is provided with bristles. The first brush body shaft and the second brush body shaft are respectively arranged on the first inner groove face or the second inner groove face of the upper groove, and on the first inner groove face or the second inner groove face of the lower groove.

According to an arrangement of the disclosure, the brush body shaft is configured to cause rotation of the bristles, and the rotation direction of the bristles is from a tooth root to a tooth tip.

According to an arrangement of the disclosure, the first tooth-brushing component further includes a vibrating assembly. The vibrating assembly includes a power component, a cam mechanism driven by the power component, and a first spring component and a second spring component respectively arranged on both ends of the brush body shaft. The cam mechanism is configured to drive reciprocal movement of the first spring component so as to reciprocally move the brush body shaft.

According to an arrangement of the disclosure, the rotary drive assembly includes a gear set and a power source. The gear set includes a driving gear driven by the power source and a driven gear that is fixedly connected to the brush body shaft. The driving gear is engaged with the driven gear to cause rotation of the brush body shaft.

According to an arrangement of the disclosure, the mouth-containing toothbrush includes two grooves and two housings. The two grooves are respectively contained in two said housings.

According to an arrangement of the disclosure, the mouth-containing toothbrush includes two said grooves. The two grooves are contained in said housing.

According to an arrangement of the disclosure, the first tooth-brushing component further includes a vibrating assembly. The vibrating assembly includes a power component, a cam mechanism driven by the power component, and a first spring component and a second spring component respectively arranged on both ends of the brush body shaft. The cam mechanism is configured to drive reciprocal movement of the first spring component so as to reciprocally move the brush body shaft.

According to an arrangement of the disclosure, the first tooth-brushing component further includes a vibrating assembly. The vibrating assembly includes a power component, a cam mechanism driven by the power component, and a first spring component and a second spring component respectively arranged on both ends of the brush body shaft. The cam mechanism is configured to drive reciprocal movement of the first spring component so as to reciprocally move the brush body shaft.

According to an arrangement of the disclosure, an elastic coefficient of the first spring component is greater than that of the second spring component.

According to an arrangement of the disclosure, the vibrating assembly further includes a first connector and a second connector, which are respectively fixed to both ends of the brush body shaft. An end of the first spring assembly is fixed to the first connector, and the other end is fixed to the housing. An end of the second spring component is fixed to the second connector, and the other end is fixed to the housing. The outer side of the cam contacts the first connector.

According to an arrangement of the disclosure, the mouth-containing toothbrush further includes a second tooth-brushing component. The second tooth-brushing component is arranged in the bottom face to clean occlusal faces of the teeth.

According to an arrangement of the disclosure, the second tooth-brushing assembly includes an elastic structural body.

The surface of the elastic structural body is formed with protrusions that protrude outwardly.

According to an arrangement of the disclosure, the housing further includes a closed chamber to contain the rotary drive assembly.

According to an arrangement of the disclosure, the chamber is arranged in parallel on an inner side or an outer side of the groove.

According to an arrangement of the disclosure, the mouth-containing toothbrush includes two said grooves. The chamber is arranged between the two grooves.

According to an arrangement of the disclosure, the chamber extends along the extension direction of the groove.

BRIEF DESCRIPTION OF THE DRAWINGS

By considering the following detailed description of preferred arrangements of the present disclosure in conjunction with the drawings, various objects, features and advantages of the present disclosure will become more apparent. The drawings are only exemplary illustrations of the present disclosure, and are not necessarily drawn to scale. In the drawings, the same reference numerals denote the same or similar elements. In the drawings.

DETAILED DESCRIPTION

Figure 1:
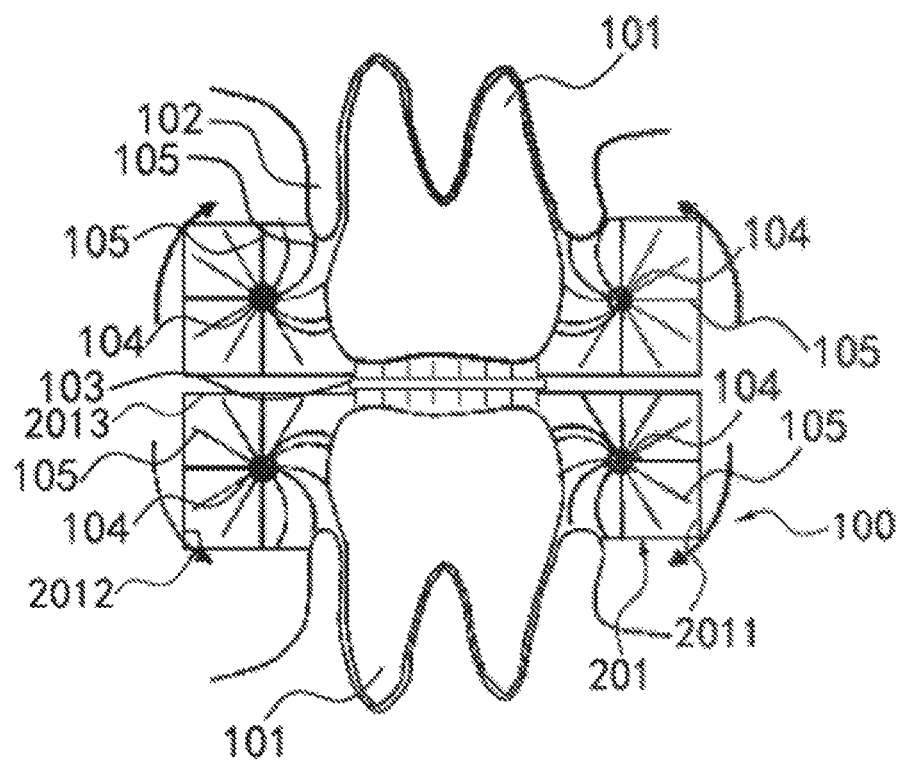
FIG. 1 is a principle diagram of a mouth-containing toothbrush according to an exemplary arrangement of present disclosure.

The exemplary arrangement is now more fully described with reference to the drawings. However, the exemplary arrangement can be embodied in various ways and should not be construed as limited to the arrangement set forth herein. Rather, these arrangements are provided so that the present disclosure will be thorough and complete, and will fully convey the concept of the exemplary arrangement to those skilled in the art. The same reference numerals in the figures denote the same or similar structures, and thus the detailed descriptions thereof will be omitted.

With reference to FIGS. 1 to 4, in an arrangement of the present disclosure, a mouth-containing toothbrush is provided, which includes a housing 203, and a first tooth-brushing element 100 and a second tooth-brushing component 103 which are arranged on the housing 203. The first tooth-brushing component 100 is used for cleaning the surfaces of the teeth 101. For example, but not limitation, the first tooth-brushing component 100 may be disposed on the outer surfaces of the teeth 101 to clean the outer surfaces. The first tooth-brushing component 100 may also be arranged on the inner surfaces of the teeth 101 to clean the inner surfaces. These fall within the protection scope of the present disclosure. According to a specific arrangement of the present disclosure, the first tooth-brushing component 100 may include a rotatable brush body shaft 104 and brush bristles 105 arranged on the outer circumference of the brush body shaft 104. The brush body shaft 104 may be driven by a rotary drive assembly, such that rotation of the brush bristles 105 may be in the direction from the tooth root of the teeth 101 to the tooth tip to prevent tartar from being brought to the gum's gap and dental calculus from being formed, which improves the cleaning effect of the gum's gap. Further, the first tooth-brushing component 100 may also include a vibrating assembly, which may be used to drive the brush body shaft 104 to vibrate along the extension direction of the housing 203, such that the brush bristles 105 may reach more regions of the gum's gap, in order to achieve a better tooth-brushing effect. The direction of the arrow in FIG. 1 may indicate the rotation direction of the brush body shaft 104.

Figure 2:
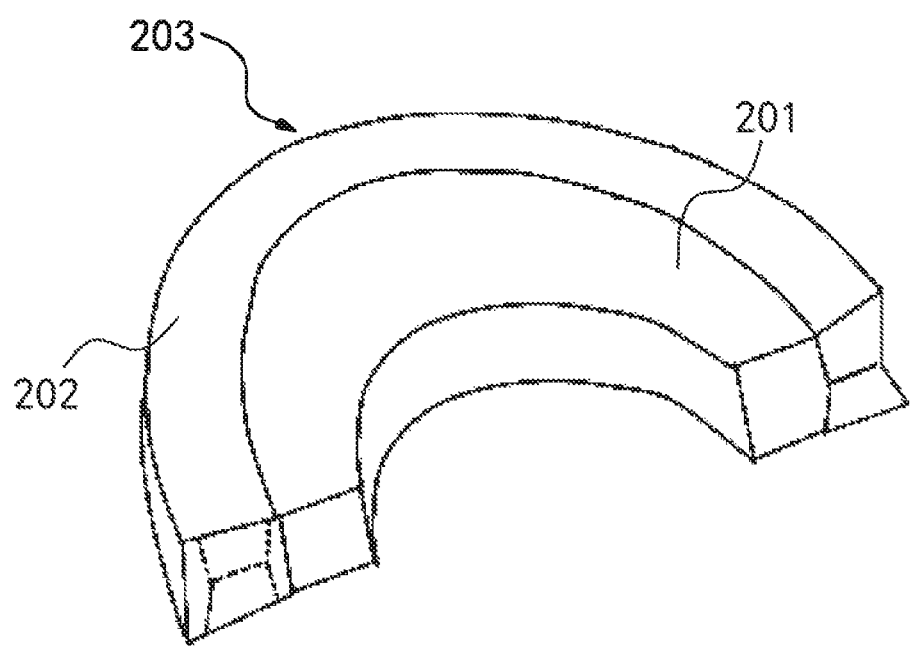
FIG. 2 is a schematic diagram of the housing structure of a mouth-containing toothbrush according to an exemplary arrangement of present disclosure.

With continued reference to FIG. 2, according to a specific arrangement of the present disclosure, the housing 203 may include a groove 201 for containing the teeth 101. The groove 201 may include an upper groove and a lower groove, which are respectively at the upper and lower parts of the housing 203 and respectively match the teeth 101 in the upper and lower gums of people. Each groove, for example, the upper groove or the lower groove may respectively have a first inner groove face 2011, a second inner groove face 2012 and a bottom face 2013 arranged between the first inner groove face 2011 and the second inner groove face 2012. The first inner groove face 2011 faces the outer surfaces of the teeth 101, while the second inner groove face 2012 faces the inner surfaces of the teeth 101. The lower groove may also have a first inner groove face 2011, a second inner groove face 2012 and a bottom face 2013 arranged between the first inner groove face 2011 and the second inner groove face 2012.

With continued reference to FIG. 2, according to a specific arrangement of the present disclosure, the housing 203 may further include a closed chamber 202, to contain the rotary drive assembly for driving rotation of the brush body shaft 104 and the vibrating assembly for driving vibration of the brush body shaft 104. The actual structure to be packed may be selected according to actual needs. These fall within the protection scope of the present disclosure. According to a specific arrangement of the present disclosure, the chamber 202 may be arranged between the upper and lower grooves, be arranged in parallel with the inner side or the outer side of the whole groove 201, and extends in the extending direction of the groove 201, which fall with the protection scope of the present disclosure.

According to a specific arrangement of the present disclosure, the chamber 202 may employ an elastic film sealing member, to isolate the chamber 202 from the outer space of the housing 203, which reduces the resistance to the transmission elements as possible when it has the effect of isolating the inner structure from the outer structure. According to a specific arrangement of the present disclosure, the housing 203 may be made of rubber or flexible plastic. In order to meet the needs of different groups of people, the housing 203 provided in the present disclosure may be configured in different dimensions, such that the purpose of brushing may be achieved better.

With continued reference to FIG. 1, according to a specific arrangement of the present disclosure, the first tooth-brushing component 100 may include the brush body shaft 104 and brush bristles 105 arranged on the outer circumference of the brush body shaft 104. According to a specific arrangement of the present disclosure, the brush bristles 105 arranged on the outer circumference of the brush body shaft 104 may be uniformly provided, and the extending direction of the brush bristles 105 may be perpendicular to the outer circumference of the brush body shaft 104, which fall within the protection scope of the present disclosure.

With continued reference to FIG. 1, in the present arrangement, two sets of the first tooth-brushing components 100 are respectively arranged between the teeth 101 and the first inner groove face 2011 and between the teeth 101 and the second inner groove face 2012. Optionally, only one set of the first tooth-brushing component 100 may also be provided. The first tooth-brushing component 100 is arranged between the teeth 101 and the first inner groove face 2011 or between the teeth 101 and the second inner groove face 2012.

The brush body shaft 104 is rotatably arranged in the first inner groove face 2011 or the second inner groove face 2012 to enable the cleaning of the outer surfaces or the inner surfaces of the teeth 101. According to a specific arrangement of the present disclosure, the brush body 104 may extend in the extending direction of the groove 201, such that the brush bristles 105 on the brush body shaft 104 may simultaneously clean all teeth 101 on the upper gum or the lower gum, in order to improve the cleaning efficiency. According to an arrangement of the present disclosure, the first inner groove face 2011 and the second inner groove face 2012 of the upper groove may be respectively provided with the brush body shaft 104 and the brush bristles 105, such that the inner surfaces and the outer surfaces of the teeth 101 on the upper gum are respectively cleaned at the same time, in order that the tooth cleaning efficiency may be further improved. According to a specific arrangement of the present disclosure, the first inner groove face 2011 and the second inner groove face 2012 of the lower groove may be respectively provided with the brush body shaft 104 and the brush bristles 105. The theory about the lower groove is the same as theory about the upper groove, which will be omitted here to avoid redundancy. According to a specific arrangement of the present disclosure, the groove 201 may include the upper and lower grooves. The first inner groove face 2011 and the second inner groove face 2012 of the upper and lower grooves may be respectively provided with the brush body shaft 104 and the brush bristles 105. That is to say, the mouth-containing toothbrush provided by the present arrangement may include four brush body shafts 104, which are respectively arranged in the first inner groove faces 2011 and the second inner groove faces 2012 of the upper and lower grooves, such that the tooth-cleaning efficiency is further improved.

Figure 3:
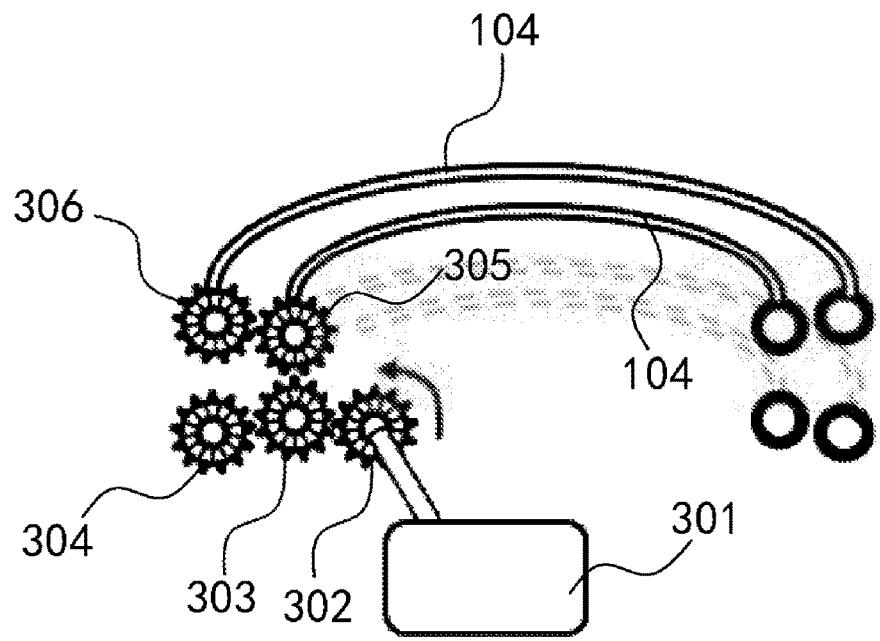
FIG. 3 is a principle diagram of a rotary drive assembly of a mouth-containing toothbrush according to an exemplary arrangement of present disclosure.

With reference to FIG. 3, according to an arrangement of the present disclosure, the first tooth-brushing component 100 may include the rotary drive assembly for driving rotation of the brush body shaft 104, which may include a gear set and a power source 301. The gear set may include a driving gear 302 that is directly driven by the power source 301 and a driven gear that is fixedly connected to the brush body shaft 104. The driving gear 302 is directly or indirectly engaged with the driven gear, to rotate the brush body shaft 104, such that each bristle 105 moves from tooth root to tooth tip, whereby preventing dirt from entering the gum's gap to generate tartar and improving the cleaning effect.

With continued reference to FIG. 3, according to an arrangement of the present disclosure, the gear set may include a driven gear set that includes a first driven gear 303 and a second driven gear 304. The first driven gear 303 may be directly engaged with the driving gear 302, while the second driven gear 304 may be engaged with the first driven gear 303. The brush body shaft 104 arranged in the first inner groove face 2011 may be defined as a first brush body shaft, while the brush body shaft 104 arranged in the second inner groove face 2012 is the second brush body shaft. The first driven gear 303 and the second driven gear 304 may be respectively fixedly connected to the second brush body shaft and the first brush body shaft. The first brush body shaft and the second brush body shaft are respectively arranged on the outer surfaces and the inner surfaces of the teeth.

With continued reference to FIG. 1, according to a specific arrangement of the present disclosure, the upper and lower grooves are respectively provided with a set of the driven gear set. According to a specific arrangement of the present disclosure, the first tooth-brushing component 100 may include two power sources 301. Each of the power sources 301 may respectively drive a driven gear set, but is not limited thereto. According to a specific arrangement of the present disclosure, the same driving gear 302 may drive two driven gear sets. For example, but not limited to, the third driven gear 305 and the fourth gear 306 may constitute a second driven gear set that may be located in the upper groove. The first driven gear 303 and the second driven gear 304 may constitute a first driven gear set that may be located in the lower groove. According to a specific arrangement of the present disclosure, the power source 301 may be a power supply or other power mechanisms, which may be selected according to actual needs. These fall within the protection scope of the present disclosure.

With continued reference to FIG. 3, the first driven gear 303 may be directly engaged with the driving gear 302 so as to be driven by the driving gear 302, and the first driven gear 303 may be respectively and directly engaged with the second driven gear 304 and the third driven gear 305 to drive rotation of the second driven gear 304 and the third driven gear 305. The fourth driven gear 306 is directly engaged with the third driven gear 305, so as to be driven by the third driven gear 305 to be rotated. In the present specific arrangement, the driving gear 302 may be rotated counterclockwise. As shown in FIG. 3, the first driven gear 303 that is directly engaged with the driving gear 302 is rotated clockwise, the second driven gear 304 and the third driven gear 305 are respectively rotated counterclockwise, and the fourth driven gear 306 is rotated clockwise. The brush body shaft 104 driven by the first driven gear 303 may clean the inner surfaces of the teeth 101 on the lower gum. The brush body shaft 104 driven by the second driven gear 304 may clean the outer surfaces of the teeth 101 on the lower gum. The brush body shaft 104 driven by the third driven gear 305 may clean the inner surfaces of the teeth 101 on the upper gum. The brush body shaft 104 driven by the fourth driven gear 306 may clean the outer surfaces of the teeth 101 on the upper gum. Thereby, each bristle 105 may move from tooth root of the tooth 101 to the tooth tip to prevent dirt entering the gum's gap.

According to a specific arrangement of the present disclosure, the driving gear 302 may be configured to be directly engaged with the third driven gear 305, or the second driven gear 304, or the fourth driven gear 306. As long as each gear of the gear set is rotated, the brush body shaft 104 may rotate the bristles 105 to move from tooth root of the teeth 101 to tooth tip. These fall within the protection scope of the present disclosure. According to an arrangement of the present disclosure, the brush body shaft 104 may be made of plastic with ductility. For example, the brush body shaft 104 may be made of flexible plastic with ductility. According to a specific arrangement of the present disclosure, the brush body shaft 104 may have an elliptical cross section, but not limited thereto. Other shaped cross section may be provided according to actual needs, which falls within the protection scope of the present disclosure.

Figure 4:
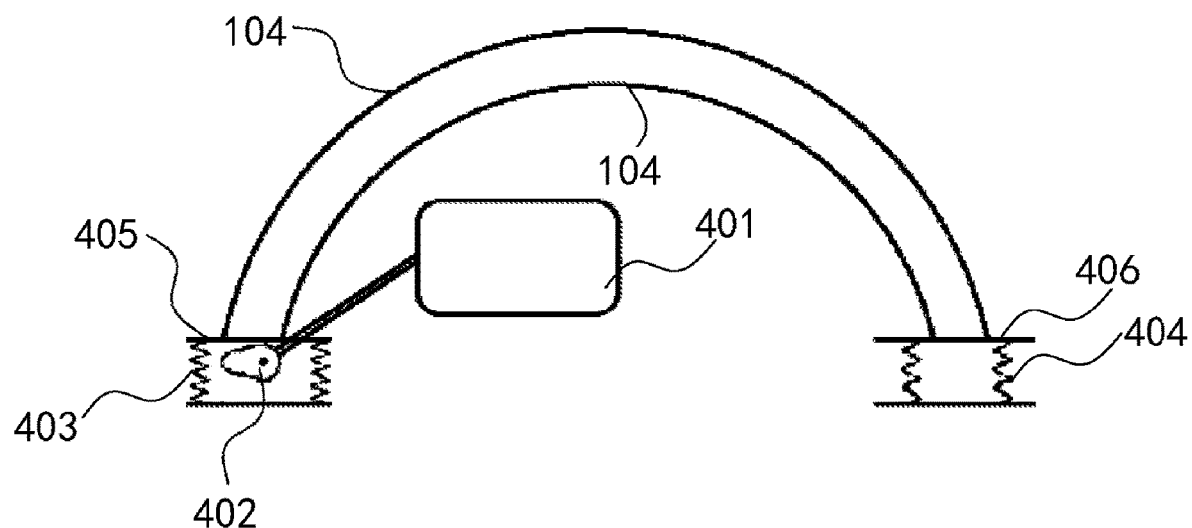
FIG. 4 is a principle diagram of a vibrating assembly of a mouth-containing toothbrush according to an exemplary arrangement of present disclosure.

With reference to FIG. 4, according to an arrangement of the present disclosure, the first tooth-brushing component 100 may further include the vibrating assembly, which may include a power component 401, a cam mechanism driven by the power component 401, and a first spring component 403 and a second spring component 404 respectively arranged on both ends of the brush body shaft 104. The cam mechanism may include a cam 402 and a cam shaft, the cam shaft may be directly driven by the power component 401. The cam 402 may drive stretching of the first spring component 403, so that an end in which the first spring component 403 is provided moves towards an end in which the second spring component 404 is provided. According to a specific arrangement of the present disclosure, the power component 401 may be a power supply or other power mechanisms, which may be selected according to actual needs. These fall within the protection scope of the present disclosure.

With continued reference to FIG. 4, according to a specific arrangement of the present disclosure, the cam shaft may be arranged between both ends of the first spring component 403, and the first spring component 403 may be in a stretched state. When the cam 402 is rotated to the maximum stroke, the spring component 403 is pushed to be further stretched, such that the end in which the first spring component 403 is provided is pushed to move towards the end in which the second spring component 404 is provided. When the cam 402 is rotated to the minimum stroke, under the action of the elastic force of the first spring component 403 and the second spring component 404, the end of the brush body shaft 104 in which the first spring component 403 is provided may move away from the end in which the second spring component 404 is provided. In summary, the cam structure provided in the present disclosure may drive the reciprocal movement of the brush body shaft 104 in its extension direction via the rotation of the cam 402 to generate the vibration, so as to cause vibration of the bristles 105 along the extension direction of the brush body shaft 104, such that the bristles 105 reach more regions of the gum's gap, thereby achieving a better tooth-brushing effect. In the return stroke of the cam 402, in order that the brush body shaft 104 may smoothly return, according to an arrangement of the present disclosure, an elastic coefficient of the first spring component 403 may be greater than the elastic coefficient of the second spring component 404. According to a specific arrangement of the present disclosure, the vibration frequency of the vibrating assembly may be selected according to actual needs, which falls within the protection scope of the present disclosure.

With continued reference to FIG. 4, according to an arrangement of the present disclosure, the vibrating assembly may further include a first connector 405 fixed to an end of the brush body shaft 104. One end of the first spring component 403 may be fixed to the first connector, the other end of the first spring component 403 may be fixed to the housing 203, and the outer side of the cam 402 may contact the first connector 405, so as to drive the movement thereof. According to a specific arrangement of the present disclosure, the first connector 405 may be a plate or other structures, which may be selected according to actual needs. These fall within the protection scope of the present disclosure. According to a specific arrangement of the present disclosure, the first spring component 403 may be directly fixed to the housing 203, and the other first connect 405 is pre-buried in the housing 203. The first spring component 403 may be fixed to the housing 203 by the pre-buried first connector 405, which falls within the protection scope of the disclosure. According to a specific arrangement of the present disclosure, the end portion of the brush body shaft 104 may be rotatably disposed in the first connector 405. Any configuration that the brush body shaft 104 is flexibly rotatable and may be sufficiently lubricated falls within the protection scope of the disclosure.

According to a specific arrangement of the present disclosure, the vibrating assembly may further include the first connector 405 that is fixed to the other end of the brush body shaft 104. One end of the second spring component 404 may be fixed to the second connector 406, and the other end of the second spring component 404 may be fixed to the housing 203. For example, the arrangement and the operating principle of the second spring component 404 are similar to those of the first spring component 403, which is not repeatedly described herein. According to a specific arrangement of the present disclosure, the first spring component 403 and the second spring component 404 may include at least one elastic element, which may be selected according to actual needs. These fall within the protection scope of the present disclosure.

With reference to FIG. 1, according to a specific arrangement of the present disclosure, the second tooth-brushing component 103 may be arranged in the bottom face 2013 of the upper groove or the lower groove, in order to clean the occlusal faces of the teeth. According to an arrangement of the present disclosure, the second tooth-brushing component 103 may include an elastic structural body that may be arranged in the chamber 202. On the one hand, the storage of the rotary drive assembly and the vibrating assembly is facilitated. On the other hand, in use of the mouth-containing toothbrush, a small force may be used to engage the teeth from up and down, thereby achieving the cleaning effect of the occlusal faces of the teeth 101. According to a specific arrangement of the present disclosure, the surface of the elastic structural body may protrude outwardly to form protrusions, in order to increase the frictional force between the occlusal faces of the teeth 101 and the elastic structural body.

The described features, structures or characteristics may be combined in one or more arrangements in any suitable manner. In the above description, numerous specific details are provided to give a thorough understanding of arrangements of the present disclosure. However, those skilled in the art will realize that the technical solutions of the present disclosure may be practiced without one or more specific details, or that other methods, components, materials, etc. may be used. In other cases, the well-known structures, materials or operations are not shown or described in detail to avoid blurring all aspects of the disclosure.

What is claimed is:

1. A mouth-containing toothbrush, comprising:
a housing having a groove for containing teeth, wherein the groove has a first inner groove face, a second inner groove face, and a bottom face connected between the first inner groove face and the second inner groove face;
a first tooth-brushing component for cleaning surfaces of the teeth, wherein
the first tooth-brushing component comprises a brush body shaft and bristles arranged on an outer circumference of the brush body shaft;
the brush body shaft is rotatably arranged between the teeth and at least one of the first inner groove face and the second inner groove face;
the brush body shaft extends along an extension direction of the groove; and a rotary drive assembly configured to drive the brush body shaft, wherein the first tooth-brushing component further comprises a vibrating assembly;

the vibrating assembly comprises a power component, a cam mechanism driven by the power component, and a first spring component and a second spring component respectively arranged on both ends of the brush body shaft; and the cam mechanism is configured to drive reciprocal movement of the first spring component so as to reciprocally move the brush body shaft.

2. The mouth-containing toothbrush according to claim 1, wherein the brush body shaft is configured to cause rotation of the bristles, and a rotation direction of the bristles is from a tooth root to a tooth tip.

3. The mouth-containing toothbrush according to claim 2, wherein the cam mechanism is configured to drive the reciprocal movement of the first spring component, causing the brush body shaft to move reciprocally.

4. The mouth-containing toothbrush according to claim 2, wherein the mouth-containing toothbrush further comprises a second tooth-brushing component;

the second tooth-brushing component is arranged on the bottom face; and the second tooth-brushing component is configured to clean occlusal faces of the teeth.

5. The mouth-containing toothbrush according to claim 1, wherein the rotary drive assembly comprises a gear set and a power source;

the gear set comprises a driving gear driven by the power source and a driven gear that is fixedly connected to the brush body shaft; and the driving gear is engaged with the driven gear to cause rotation of the brush body shaft.

6. The mouth-containing toothbrush according to claim 5, wherein the mouth-containing toothbrush comprises another groove, wherein the groove and the another groove are contained in said housing.

7. The mouth-containing toothbrush according to claim 6, wherein the cam mechanism is configured to drive the reciprocal movement of the first spring component, causing the brush body shaft to move reciprocally.

8. The mouth-containing toothbrush according to claim 5, wherein the cam mechanism is configured to drive the reciprocal movement of the first spring component, causing the brush body shaft to move reciprocally.

9. The mouth-containing toothbrush according to claim 1, wherein the mouth-containing toothbrush comprises another groove and another housing; and the another groove is contained in the another housing.

10. The mouth-containing toothbrush according to claim 9, wherein the cam mechanism is configured to drive the reciprocal movement of the first spring component, causing the brush body shaft to move reciprocally.

11. The mouth-containing toothbrush according to claim 1, wherein a first elastic coefficient of the first spring component is greater than a second elastic coefficient of the second spring component.

12. The mouth-containing toothbrush according to claim 1, wherein the vibrating assembly further comprises a first connector and a second connector;

the first connector and the second connector are respectively fixed to the both ends of the brush body shaft;

a first end of the first spring assembly is fixed to the first connector;

a second end of the first spring is fixed to the housing;

a first end of the second spring component is fixed to the second connector; and a second end of the second spring is fixed to the housing; and an outer side of the cam contacts the first connector.

13. The mouth-containing toothbrush according to claim 1, wherein the mouth-containing toothbrush further comprises a second tooth-brushing component;

the second tooth-brushing component is arranged on the bottom face; and the second tooth-brushing component is configured to clean occlusal faces of the teeth.

14. The mouth-containing toothbrush according to claim 13, wherein the second tooth-brushing assembly comprises an elastic structural body; and a surface of the elastic structural body is formed with protrusions that protrude outwardly.

15. The mouth-containing toothbrush according to claim 1, wherein the mouth-containing toothbrush further comprises a second tooth-brushing component;

the second tooth-brushing component is arranged on the bottom face; and the second tooth-brushing component is configured to clean occlusal faces of the teeth.

16. The mouth-containing toothbrush according to claim 1, wherein the housing further comprises a closed chamber to contain the rotary drive assembly.

17. The mouth-containing toothbrush according to claim 16, wherein the chamber is arranged in parallel on an inner side or an outer side of the groove.

18. The mouth-containing toothbrush according to claim 16, wherein the mouth-containing toothbrush comprises another groove, wherein the chamber is arranged between the groove and the another groove.

19. The mouth-containing toothbrush according to claim 16, wherein the chamber extends along an extension direction of the groove.

* * * * *